UNITED STATES PATENT OFFICE 2,566,162

ACRYLYL SULFANILAMIDES AND POLYMERS THEREOF

John R. Caldwell, Kingsport, Tenn., assignor to Eastman Kodak Company, Rochester, N. Y., a corporation of New Jersey No Drawing. Application August 18, 1950, Serial No. 180,300

12 Claims. (Cl. 260—79.3)

This invention relates to sulfanilamides containing an acrylyl or methacrylyl group, to polymers thereof, and to a process for their preparation.

It is known that sulfanilamide can be substituted in the $N^1$-nitrogen atom with acrylyl group and that such compounds are principally of therapeutic interest. For example, G. Rieben in Schweiz-med. Wochschr., volume 73, pages 797–801 (1943), C. A. 38, page 5304 (1944), describes the compound $N^1$-sulfanilyl acrylamide; E. Albert Zeller in Helv. Chim. Acta, volume 25, pages 216–229 (1942), C. A. 36, page 5190 (1942), describes the compound $N^1$-($\beta,\beta$-dimethylacrylyl) sulfanilamide; and R. Pulver et al. in Arch. exptl. Path. Pharmakol., volume 201, pages 491–500 (1943), C. A. 38, page 3723 (1944), describes the compound $N^1$-crotonyl sulfanilamide (N-sulfanilyl crotonamide). Compounds of the above-mentioned type contain in each case an unsubstituted amino group attached directly to the sulfanilyl nucleus. All attempts to form resinous polymers from these and similar prior art compounds have been unsuccessful.

We have now found that by substituting an acrylyl or methacrylyl group on the $N^4$-nitrogen atom of the sulfanilyl group and a hydrocarbon group such as alkyl or phenyl on the $N^1$-nitrogen atom of the sulfanilyl group that such compounds are not only valuable as biological and therapeutic chemicals and as chemical intermediates, but more especially are capable of forming valuable homopolymers and copolymers by the usual well-known methods of polymerizing organic unsaturates.

The new class of compounds of the invention are represented by the following general formula:

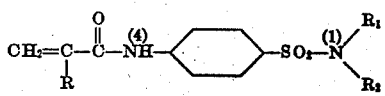

wherein R represents an atom of hydrogen or a methyl group, $R_1$ represents an atom of hydrogen, an alkyl group containing from 1 to 4 carbon atoms (e. g. methyl, ethyl, propyl, isopropyl, n-butyl, etc. groups) and a phenyl group, and $R_2$ represents an alkyl group containing from 1 to 4 carbon atoms and a phenyl group. The new compounds are crystalline substances at normal temperatures and soluble in organic solvents such as methanol, ethanol, 1,4-dioxane, mixtures of these solvents with minor portions of water, etc. The resinous homopolymers and resinous copolymers derived therefrom are characterized by having relatively high heat distortion temperatures and a high degree of surface hardness.

It is, accordingly, an object of the invention to provide a new class of unsaturated sulfanilamides, and polymers thereof. Another object is to provide a method for preparing the same. Other objects will become apparent hereinafter.

In accordance with the invention, I prepare the new monomers of the invention by treating an $N^1$-substituted sulfanilamide with acrylyl or methacryl chloride in the presence of a base such as sodium hydroxide, potassium hydroxide, pyridine, quinoline, etc., and then separating the product from the reaction mixture, followed by recrystallizing from a solvent such as, for example, ethanol, etc.

The polymerization of the new compounds of the invention alone or conjointly with one or more other unsaturated organic compounds is advantageously carried out in the presence of a polymerization catalyst. Peroxide polymerization catalysts which are soluble in the monomers or in solvent mediums for the polymerization can be employed, e. g. organic peroxides such as benzoyl peroxide, acetyl peroxide, lauroyl peroxide, tertiary butyl hydroperoxide, etc. Water soluble peroxides can also be used, e. g. hydrogen peroxide, ammonium persulfate, potassium persulfate, sodium persulfate, persulfuric acid, sodium perborate, the water-soluble salts of percarbonic acid, the water-soluble salts of perphosphoric acid, the water-soluble salts of sulfo-per acid (Caro's acid). Boron trifluoride is also an effective polymerization catalyst. Mixtures of the catalysts can be employed.

The polymerizations can be carried out in bulk (mass), in solvents or in heterogeneous dispersion where the monomer or the mixture of monomers is dispersed in a nonsolvent for the monomers, the particles of dispersed monomers being very small (emulsion) or relatively large (bead or granular). In both bulk and solvent polymerizations, the organic peroxide catalysts are advantageously employed. Suitable solvents include acetone, 1,4-dioxane, methanol, ethanol, mixtures of these solvents with minor portions of water, benzene, etc. Mixtures of solvents can be employed.

For emulsion polymerization, any nonsolvent for the monomer or the mixture of monomers can be employed, water being especially advantageous. The monomer or the mixture of monomers can be advantageously emulsified in the water using emulsifying agents such as salts of higher fatty acids, e. g. sodium or potassium stearate, palmitate, etc., or ordinary soaps, salts of higher fatty alcohol sulfates, e. g. sodium or potassium lauryl sulfate, sodium or potassium di(2-ethylhexyl) sulfosuccinate, sodium or potassium cetyl sulfate, sodium or potassium stearyl sulfate, etc., salts of aromatic sulfonic acids, e. g. sodium or potassium salts of alkylnaphthalene sulfonic acids, etc., higher molecular weight quaternary ammonium salts, e. g. dimethyl benzylphenyl ammonium chloride, quaternary ammonium salts containing the radicals $C_{15}H_{31}$ and $C_{17}H_{35}$, etc. Mixtures of emulsifying agents can be employed. For bead or granular polymerization relatively poor dispersing agents such as starch, methylated starch, gum arabic, polyvinyl alcohol, partly hydrolyzed polyvinyl acetate, gelatin, sodium glycolate, etc. can be employed. Mixtures of these dispersing agents can also be employed. In the above polymerizations wherein the monomer or the mixture of monomers is dispersed in a nonsolvent, the dispersion can be facilitated by stirring, shaking or tumbling the polymerization mixture. Heat accelerates all the polymerizations, a temperature of from 35° to 150° C. for a period of from an hour to as much as 48 hours being advantageous.

The copolymers of the invention may contain variable amounts of each comonomer and are obtained with starting polymerization mixtures containing from 15 to 85 parts by weight of the unsaturated sulfanilamides of the invention and from 85 to 15 parts by weight of one or more other unsaturated organic compounds. The resinous copolymers obtained have been found to be substantially of the same proportions as the starting mixtures. Suitable other unsaturates for preparing the copolymers of the invention are, for example, vinyl carboxylic acid esters such as vinyl acetate, vinyl propionate, vinyl benzoate, etc., vinyl chloride, vinylidene dichloride, acrylic and methacrylic acid alkyl esters such as methyl acrylate, methyl methacrylate, ethyl acrylate, butyl acrylate, etc., similar alkyl esters of maleic, fumaric, itaconic acids, allyl and methallyl derivatives such as allyl alcohol, methallyl alcohol, allyl acetate, methallyl acetate, etc., acrylonitrile and methacrylonitrile.

The following examples will serve to illustrate further my new unsaturates, polymers thereof, and the manner of preparing the same.

*Example 1.—$N^1$-methyl-$N^4$-acrylyl sulfanilamide*

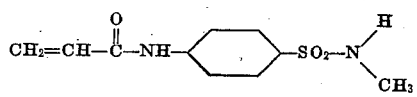

34 g. (0.18 mol) of $N^1$-methyl sulfanilamide were suspended in 200 cc. of water and the suspension was stirred rapidly, while 23 g. (0.25 mol) of acrylyl chloride dissolved in 100 cc. of diethyl ether and 25 g. of anhydrous sodium carbonate dissolved in 100 cc. of water were added simultaneuosly and at the same rate to the suspension. The precipitate which formed was filtered off and washed with water. The precipitate was then recrystallized from dilute alcohol to give crystals of $N^4$-acrylyl-$N^1$-methyl sulfanilamide which had a melting point of 156° C. Analysis of the crystals gave a nitrogen content of 11.44% by weight compared with calculated theory of 11.67% of nitrogen. The yield of product was 46% of the theoretical.

*Example 2.—$N^1$-dimethyl-$N^4$-acrylyl sulfanilamide*

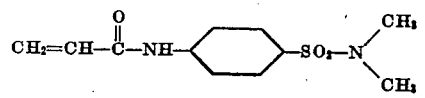

40 g. (0.20 mol) of $N^1$-dimethyl sulfanilamide were dissolved in 250 cc. of warm 1,4-dioxane, and to the solution were added simultaneously and dropwise with stirring 18 g. (0.20 mol) of acrylyl chloride dissolved in 100 cc. of 1,4-dioxane and 24 g. of dimethyl aniline dissolved in 100 cc. of 1,4-dioxane. The dark product obtained was poured into 2 liters of ice water and on standing crystallization took place. No satisfactory method of recrystallizing the compound was found. The yield was 51% of the theoretical. It had a melting point of 75° C. and a nitrogen content by weight of 10.6% compared with the calculated theory of 11.5% of nitrogen.

*Example 3.—$N^1$-methyl-$N^4$-methacrylyl sulfanilamide*

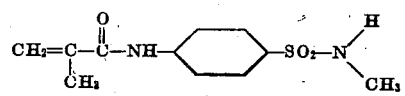

37 g. (0.20 mol) of $N^1$-methyl sulfanilamide were suspended in 250 cc. of diisopropyl ether, stirred well, and to it were added dropwise and simultaneously 21 g. (0.20 mol) of methacrylyl chloride in 200 cc. of dry diisopropyl ether and 20 g. of anhydrous sodium carbonate in 200 cc. of water. The precipitate which formed was filtered off and washed with water. The product, $N^4$-methacrylyl-$N^1$-methyl sulfanilamide, had a melting point of 173° C. and a nitrogen content by weight of 10.8% compared with the calculated theory of 11.1% of nitrogen. The yield of product was 67% of theory.

*Example 4.—$N^1$-dimethyl-$N^4$-methacrylyl sulfanilamide*

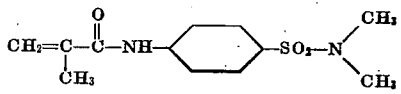

40 g. (0.20 mol) of $N^1$-dimethyl sulfanilamide were dissolved in 200 cc. of warm 1,4-dioxane, and while stirring, there were added dropwise and simultaneously 21 g. (0.20 mol) of methacrylyl chloride in 75 cc. of 1,4-dioxane and 16 g. of pyridine in 75 cc. of 1,4-dioxane. The mixture was poured into 2 liters of ice water and on standing the product crystallized out of solution. It was recrystallized from alcohol to give $N^1$-dimethyl-$N^4$-methacrylyl sulfanilamide having a melting point of 120° C., and a nitrogen content by weight of 10.2% compared with the calculated theory of 10.5% of nitrogen. The yield was 90% of theory.

*Example 5.—Poly $N^1$-butyl-$N^4$-methacrylyl sulfanilamide*

10 g. of $N^1$-butyl-$N^4$-methacrylyl sulfanilamide were dissolved in 50 cc. of ethyl alcohol and 0.1 g. of benzoyl peroxide was added. The solution was then heated to 60°–70° C. for a period of 24 hours. The resin obtained was precipitated into water, washed and dried. A yield of 9 g. of resinous product was obtained. The product was soluble in a mixture of acetone and methanol, it softened at 140° C., and proved very suitable for molding purposes.

*Example 6.—Poly $N^1$-diethyl-$N^4$-acrylyl sulfanilamide*

10 g. of $N^1$-diethyl-$N^4$-acrylyl sulfanilamide were dissolved in 50 cc. of methyl alcohol and 0.15 g. of acetyl peroxide added thereto. The solution was allowed to stand at 50°–55° C. for a period of 36 hours. The resin which formed was isolated by pouring the reaction mixture into water. The precipitated resin was washed with water and dried. A yield of 8.5 g. of poly $N^1$-diethyl-$N^4$-acrylyl sulfanilamide was obtained. It was soluble in 1,4-dioxane, had a softening point of 130°–140° C. and was suitable for use in molding compositions.

*Example 7.—Poly $N^1$-diethyl-$N^4$-methacrylyl sulfanilamide*

10 g. of $N^1$-diethyl-$N^4$-methacrylyl sulfanilamide were dissolved in 50 cc. of 1,4-dioxane and 15 cc. of water and 0.2 g. benzoyl peroxide added thereto. The solution was maintained at 60° C. for 30 hours, after which it was poured into water, the precipitated resin washed with water and dried. A yield of 8 g. of poly $N^1$-diethyl-$N^4$-methacrylyl sulfanilamide was obtained. It was soluble in 1,4-dioxane and acetone, had a softening point of 120°–130° C. and gave excellent molded products.

*Example 8.—Copolymer of $N^1$-methyl-$N^4$-acrylyl sulfanilamide and acrylonitrile*

A mixture of 5.0 g. of $N^1$-methyl-$N^4$-acrylyl sulfanilamide, 10.0 g. of acrylonitrile, 0.3 g. of a fatty alcohol sulfate, 0.1 g. of potassium persulfate and 100 cc. of water was placed into a bottle and agitated at 50° to 60° C. for a period of 12 hours. The stable emulsion obtained was coagulated with sodium sulfate, and the precipitated resin was washed with water and dried. A yield of 14 g. of product was obtained. It contained 5.4% by weight of sulfur corresponding to a copolymer containing 39% by weight of $N^1$-methyl-$N^4$-acrylyl sulfanilamide. The resin was soluble in dimethyl formamide and ethylene carbonate, had a softening point of from 170° to 180° C. and was readily moldable to shaped objects and spinnable to a good quality textile fiber.

*Example 9.—Copolymer of $N^1$-methyl-$N^4$-acrylyl sulfanilamide and methyl methacrylate*

A mixture of 3.0 g. of $N^1$-methyl-$N^4$-acrylyl sulfanilamide, 12.0 g. of methyl methacrylate, 0.4 g. of a fatty alcohol sulfate, 0.1 g. of sodium persulfate and 80 cc. of water was agitated at 60° to 65° C. for a period of 10 hours. The emulsion obtained was coagulated with sodium sulfate, and the precipitated resin was washed with water. A yield of 15 g. of the resinous copolymer was obtained. It had a softening point of 120°–130° C., was soluble in ethyl acetate and 1,4-dioxane and was an excellent material for molding compositions.

*Example 10.—Copolymer of $N^1$-dimethyl-$N^4$-methacrylyl sulfanilamide and methyl methacrylate*

7.0 g. of $N^1$-dimethyl-$N^4$-methacrylyl sulfanilamide, 14.0 g. of methyl methacrylate, 0.3 g. of a sulfated fatty alcohol, 0.1 g. of potassium persulfate and 100 cc. of water were mixed together and agitated at 90° to 100° C. for a period of 3 hours. A yield of 20 g. of the resinous copolymer was obtained. Analysis for sulfur indicates that the copolymer contained 32% by weight of $N^1$-dimethyl-$N^4$-methacrylyl sulfanilamide. It was an excellent molding plastic softening at from 120° to 130° C. and was soluble in 1,4-dioxane.

Proceeding as shown in the foregoing examples, other resinous copolymers can be prepared, for example, from monomeric mixtures containing 15%, 30%, 45%, 60%, 75% or 85% by weight of at least one of the new $N^4$-acrylyl or $N^4$-meth- acrylyl sulfanilamides, the remainder in each case being either acrylonitrile, methyl acrylate, methyl methacrylate or similar unsaturates such as hereinbefore mentioned.

The polymers can be dissolved in one or more organic solvents such as, for example, acetone, methanol, 1,4-dioxane, dimethyl formamide, ethylene carbonate, ethyl acetate, etc. to form viscous dopes which, as with copolymers of $N^1$-methyl-$N^4$-acrylyl sulfanilamide and acrylonitrile, can be extruded through a spinneret into a cabinet or cell where the solvent is evaporated to give monofilaments which can be spun to yarn. Such viscous dopes can also be coated on a film-forming surface of metal or glass, the solvent evaporated off and the resulting film stripped from the film-forming surface. Many of the copolymers also can be molded with or without plasticizers, fillers, coloring matter, etc., by means of extrusion, injection or compression methods into shaped objects which can be worked into finished form by heat and mechanical means.

What I claim is:

1. A compound having the general structural formula:

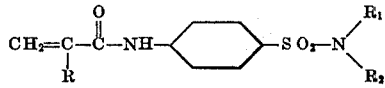

wherein R represents a member selected from the group consisting of an atom of hydrogen and a methyl group, $R_1$ represents a member selected from the group consisting of an atom of hydrogen, an alkyl group containing from 1 to 4 carbon atoms and a phenyl group, and $R_2$ represents a member selected from the group consisting of an alkyl group containing from 1 to 4 carbon atoms and a phenyl group.

2. $N^1$-methyl-$N^4$-acrylyl sulfanilamide.
3. $N^1$-dimethyl-$N^4$-acrylyl sulfanilamide.
4. $N^1$-methyl-$N^4$-methacrylyl sulfanilamide.
5. $N^1$-dimethyl-$N^4$-methacrylyl sulfanilamide.
6. $N^1$-diethyl-$N^4$-acrylyl sulfanilamide.
7. A polymer of a compound having the general structural formula:

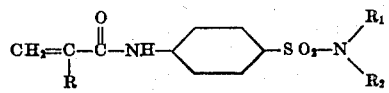

wherein R represents a member selected from the group consisting of an atom of hydrogen and a methyl group, $R_1$ represents a member selected from the group consisting of an atom of hydrogen, an alkyl group containing from 1 to 4 carbon atoms and a phenyl group, and $R_2$ represents a member selected from the group consisting of an alkyl group containing from 1 to 4 carbon atoms and a phenyl group.

8. Poly $N^1$-diethyl-$N^4$-acrylyl sulfanilamide.
9. Poly $N^1$-butyl-$N^4$-methacrylyl sulfanilamide.
10. A copolymer of from 15 to 85 parts by weight of $N^1$-methyl-$N^4$-acrylyl sulfanilamide and from 85 to 15 parts by weight of acrylonitrile.
11. A copolymer of from 15 to 85 parts by weight of $N^1$-methyl-$N^4$-acrylyl sulfanilamide and from 85 to 15 parts by weight of methyl methacrylate.
12. A copolymer of from 15 to 85 parts by weight of $N^1$-dimethyl-$N^4$-methacrylyl sulfanilamide and from 85 to 15 parts by weight of methyl methacrylate.

JOHN R. CALDWELL.

No references cited.